Aug. 16, 1960     G. F. DALY     2,949,058
REFLECTING GUIDING ATTACHMENT FOR
VEHICLE BEING PASSED AT NIGHT
Filed Oct. 5, 1956
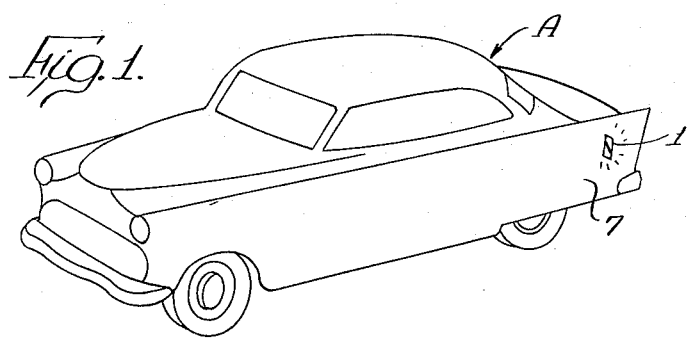
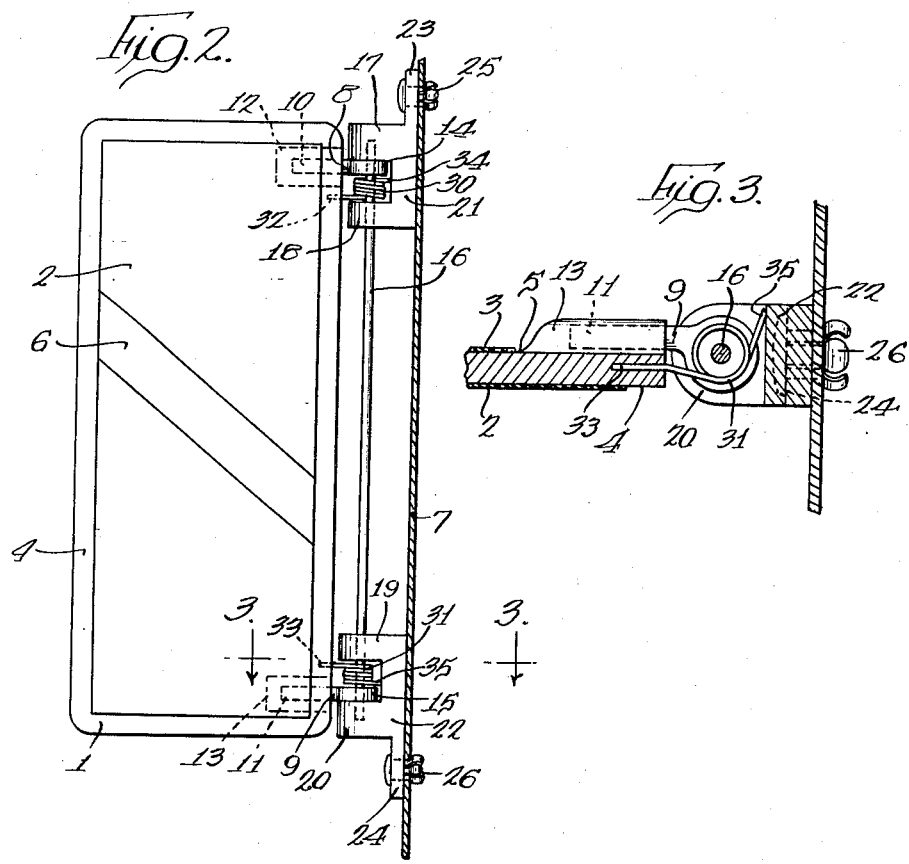
INVENTOR.
George F. Daly
BY Schroeder, Hofgren,
Brady & Wegner
Attys.

United States Patent Office 2,949,058
Patented Aug. 16, 1960

2,949,058

REFLECTING GUIDING ATTACHMENT FOR VEHICLE BEING PASSED AT NIGHT

George F. Daly, Park County, Mont.
(% A. E. Walborn, Box 643, Livingston, Mont.)

Filed Oct. 5, 1956, Ser. No. 614,226

2 Claims. (Cl. 88—81)

This invention relates to a night guide safety pass and more particularly to such a device which may be permanently and pivotally attached to a vehicle.

An object of this invention is to provide a new and improved light reflecting night guide safety pass which may be permanently attached to a vehicle and which is mounted for yielding movement so as to prevent damage thereto.

Another object of this invention is to provide a night guide safety pass, having a reflector plate with light reflecting material on both sides thereof, which may be pivotally connected to a pair of vehicle engaging brackets, and wherein the brackets may be connected to a section of a vehicle by fasteners, such as self-expanding rivets.

A further object of this invention is to provide a night guide safety pass, as defined in the preceding paragraph, wherein the reflector plate has a pair of connectors adjacent the upper and lower ends, each of which is formed with an eyelet, and having a mounting rod extending through the eyelets and mounted in said brackets so as to provide for pivotal movement of the reflector plate, and a pair of torsion springs mounted on said rod and acting between the plate and bracket and arranged to operate in opposite directions to yieldingly oppose pivoting of the reflector plate with respect to the brackets.

The objects of the invention generally set forth, together with other ancillary advantages, are attained by the construction and arrangement shown by way of illustration in the accompanying drawing, in which:

Fig. 1 is a perspective view of a vehicle, such as an automobile, showing the night guide safety pass associated therewith;

Fig. 2 is a side view in elevation of the night guide safety pass with a vehicle panel shown in section; and Fig. 3 is a horizontal section taken along the line 3—3 in Fig. 2.

While this invention is susceptible of embodiment in many different forms, there is shown in the drawings, and will herein be described in detail, an illustrative embodiment of the invention with the understanding that the present disclosure is to be considered as an exemplification of the principles of the invention and is not intended to limit the invention to the embodiment illustrated. The scope of the invention will be pointed out in the appended claims.

The night guide safety pass comprises the reflector plate 1 provided with light reflecting material 2 and 3 on opposite sides 4 and 5, respectively, of the plate. This material may be in the form of strips which may be secured to the sides of the plate 1 by suitable means, such as adhesive. The appearance of the reflector plate may be varied by applying thereto strips of light reflecting material of one or more different colors, such as the strip 6.

As shown in Fig. 1, the night guide safety pass 1 may be attached to the left rear fender 7 of an automobile, indicated generally at A. The night guide safety pass indicates to the driver of either an approaching vehicle or a passing vehicle the outermost part of the automobile upon which the night guide safety pass is mounted and renders more safe the passing of approaching automobiles or the overtaking of one automobile by another. As an added feature, the light reflecting material 2 on the rear side 4 of the plate may be red so as to serve as a general warning to a following driver.

A pair of connectors 8 and 9, adjacent opposite ends of the reflector plate 1, have one of their ends secured to the reflector plate 1, and this may be accomplished, as shown in Figs. 2 and 3, by threading ends 10 and 11, respectively, of the connectors into a pair of bosses 12 and 13 formed on the reflector plate 1. The opposite ends of the connectors 8 and 9 are formed with a pair of eyelets 14 and 15 through which a mounting rod 16 extends. The eyelets 14 and 15 are mounted between a plurality of spaced apart legs 17, 18 and 19, 20 formed in a pair of spaced apart vehicle engaging brackets 21 and 22, respectively. The vehicle engaging brackets 21 and 22 receive the ends of the mounting rod 16 and are provided with flanges 23 and 24 which engage against a section of the vehicle fender 7. The flanges 23 and 24 may be provided with openings through which fasteners may extend to connect the brackets to the vehicle section, and, as shown in the drawings, these fasteners may be in the form of self-expanding rivets 25 and 26 which, when driven through openings in the flanges and the vehicle section, will expand to maintain themselves in position.

The mounting of the reflector plate 1 to the brackets 21 and 22 by the eyelets 14 and 15 on the mounting rod 16 permits pivotal movement of the reflector plate between two extreme positions in which it lies generally parallel to the vehicle fender. The pivotal movement of the plate 1 is facilitated by the rounded ends of the bracket legs 17, 18, 19 and 20, and sections of said legs behind said ends form stops to limit pivotal movement of the plate 1.

In order to maintain the reflector plate 1 in a normal position, extending outwardly from the vehicle fender and intermediate the limits of pivotal movement of the reflector plate, a pair of torsion springs 30 and 31 are provided. These springs act in opposite directions and yieldingly maintain the reflector plate in its normal position. If the reflector plate should be contacted by a person or by some object, the reflector plate is free to move against the action of one of said springs, and, when the force is removed, the spring will restore the plate to its normal position. The springs 30 and 31 have one of their ends 32 and 33, respectively, fixedly engaged in the reflector plate 1, while the other ends 34 and 35 loosely abut a part of the mounting bracket with which it is associated.

I claim:

1. A night guide safety pass adapted for mounting on a vehicle comprising, in combination, a reflector plate having light reflecting material on both sides thereof, and means for movably mounting said plate with respect to a section of a vehicle including a pair of connectors adjacent the upper and lower end of the plate, each of said connectors having an eyelet spaced from the plate, a pair of mounting brackets associated one with each of said connectors and each being bifurcated to form a pair of spaced legs between which an eyelet is positioned, a mounting rod extending between said brackets and through said eyelets, a pair of torsion springs mounted on said rod and positioned one between each pair of bracket legs and acting between said plate and bracket, said springs arranged to operate in opposite directions to yieldingly oppose pivoting of said plate with respect to said brackets, said bracket legs having their ends adjacent the reflector plate rounded to facilitate pivoting of said plate and having sections behind said ends forming stops to limit pivotal movement of said plate.

2. A night guide safety pass adapted for mounting on a vehicle comprising, in combination, a reflector plate having light reflecting material on both sides thereof, a pair of connectors adjacent the upper and lower end of the plate, each of said connectors having an eyelet spaced from the plate, a vehicle mounting bracket means having extending arms associated two with each of said connectors, one located below and another above each of said connectors between which an eyelet is positioned, a mounting rod extending through said arms and through said eyelets, a pair of torsion springs mounted on said rod and spaced apart acting between said plate and bracket, said springs mounted to resiliently operate in opposite directions to yieldingly oppose pivoting of said plate with respect to said brackets, said springs each having one end positioned within the adjacent reflector plate edge, and a vehicle engaging flange on the bracket means having means defining an opening through which a fastener may extend to connect the bracket means to a section of the vehicle.

References Cited in the file of this patent

UNITED STATES PATENTS

| | | |
|---|---|---|
| 1,110,973 | Tischler | Sept. 15, 1914 |
| 1,507,617 | McWilliam | Sept. 9, 1924 |
| 1,600,887 | Kimbrough | Sept. 21, 1926 |
| 2,147,890 | Glasgow | Feb. 21, 1939 |
| 2,502,535 | Richards | Apr. 4, 1950 |
| 2,591,196 | Post | Apr. 1, 1952 |
| 2,645,977 | Wilford | July 21, 1953 |
| 2,690,094 | Becker | Sept. 28, 1954 |
| 2,741,948 | Parker | Apr. 17, 1956 |
| 2,787,433 | Slavsky et al. | Apr. 2, 1957 |
| 2,802,443 | Hansen | Aug. 13, 1957 |